United States Patent
Wu et al.

(10) Patent No.: US 8,200,292 B2
(45) Date of Patent: Jun. 12, 2012

(54) METHOD AND APPARATUS FOR DYNAMIC BATTERY MANAGEMENT CONTROL IN A MOBILE COMMUNICATION DEVICE

(75) Inventors: Chee-Ming Jimmy Wu, Waterloo (CA); Lyall Kenneth Winger, Waterloo (CA); Christopher Simon Book, Waterloo (CA)

(73) Assignee: Research In Motion Limited, Waterloo (CA)

( * ) Notice: Subject to any disclaimer, the term of this patent is extended or adjusted under 35 U.S.C. 154(b) by 380 days.

(21) Appl. No.: 12/393,146

(22) Filed: Feb. 26, 2009

(65) Prior Publication Data

US 2010/0216521 A1    Aug. 26, 2010

(51) Int. Cl.
*H04M 1/00* (2006.01)
*H01M 10/46* (2006.01)

(52) U.S. Cl. ......... 455/572; 455/574; 455/557; 320/132

(58) Field of Classification Search .... 455/343.2–343.6, 455/572–574; 320/132, 130, 134, 106, 113, 320/127
See application file for complete search history.

(56) References Cited

U.S. PATENT DOCUMENTS

| | | | |
|---|---|---|---|
| 5,349,535 A | | 9/1994 | Gupta |
| 5,592,069 A | | 1/1997 | Dias et al. |
| 6,433,515 B2 | | 8/2002 | Sakakibara |
| 6,768,287 B2 | | 7/2004 | Oosaki |
| 6,794,852 B2 * | | 9/2004 | Tran ............................. 320/132 |
| 6,982,544 B2 * | | 1/2006 | Tran ............................. 320/132 |
| 7,418,356 B2 * | | 8/2008 | Jin et al. .......................... 702/63 |
| 7,570,015 B2 * | | 8/2009 | Bansal et al. ................. 320/106 |
| 8,010,167 B2 * | | 8/2011 | Cotevino et al. .............. 455/574 |
| 2003/0105601 A1 | | 6/2003 | Kobayashi et al. |
| 2005/0134225 A1 | | 6/2005 | Mese et al. |
| 2006/0049805 A1 | | 3/2006 | Tran |
| 2006/0178170 A1 * | | 8/2006 | Chung et al. .................. 455/572 |
| 2007/0123303 A1 * | | 5/2007 | Book et al. ..................... 455/557 |
| 2008/0218125 A1 * | | 9/2008 | Bansal et al. ................. 320/132 |
| 2008/0218126 A1 * | | 9/2008 | Bansal et al. ................. 320/132 |

(Continued)

FOREIGN PATENT DOCUMENTS

EP    1148613 A2    10/2001

(Continued)

OTHER PUBLICATIONS

BatteryCorp: OMS(R)—BatteryTrak(R), BatteryCorp OMS(R) Services: Runtime Reserve Analysis, Audit, State of Health; printed Feb. 25, 2009 from https://www.batterycorp.com (1 page).

(Continued)

*Primary Examiner* — Vibol Tan
(74) *Attorney, Agent, or Firm* — Jones Day

(57) ABSTRACT

In accordance with the teachings described herein, systems and methods are provided for downloading battery data to a mobile communication device. A system for downloading battery data to a mobile communication device may include a mobile communication device and a data server. The mobile communication device may be configured to monitor a battery operating condition and to receive a battery profile, the battery profile including battery data for use by the mobile communication device to calculate battery status information. The data server may be used for storing battery data, the data server being configured to receive the battery operating condition from the mobile communication device and, based on the battery operating condition, send the battery profile to the mobile communication device.

28 Claims, 10 Drawing Sheets

U.S. PATENT DOCUMENTS

2010/0036628 A1* 2/2010 Plestid .......................... 702/63

FOREIGN PATENT DOCUMENTS

WO     WO 2006/066631    *   6/2006

OTHER PUBLICATIONS

Vencon Technologies: The UBA5, A Professional Battery Analyzer for Less Than You Thought; Nov. 2007 (2 pages).

BatteryCorp: OMS(R)—BatteryTrak(R), Battery Lifecycle Management; REV 042706-OMS; printed Feb. 25, 2009 from https://www.batterycorp.com/DOCS/OMS-BatteryTrak_Features%20and%20Benefits.pdf (2 pages).

Buchmann, I.: Batteries in a Portable World, Breakthrough in Battery Quick Testing; http://www.buchmann.ca/article2-page2.asp; Feb. 2001 (6 pages).

Rakhmatov, D. et al.: Battery Lifetime Prediction for Energy-Aware Computing; ISLPED '02, Aug. 12-14, 2002, Monterey, CA, USA (pp. 154-159).

EPO: Extended European Search Report for EP Application No. 09153797.7-2207 issued Sep. 3, 2009 (9 pages).

* cited by examiner

METHOD AND APPARATUS FOR DYNAMIC BATTERY MANAGEMENT CONTROL IN A MOBILE COMMUNICATION DEVICE

FIELD

The technology described in this patent document relates generally to systems and devices that monitor a battery. More particularly, systems and methods are provided for monitoring the operating characteristics of a battery.

BACKGROUND

Modern mobile communication devices, such as cell phones, PDAs, etc., typically use a rechargeable battery. The characteristics of the battery, including battery capacity versus voltage, impedance at various temperatures, etc., are known during production of the battery and may subsequently be programmed into the mobile communication device. These characteristics are typically used by the mobile communication device for calibration, or for providing battery status and usage information to the user of the device. If the battery is updated or modified after production, however, then the information programmed into the mobile communication device may no longer be applicable or provide accurate information to the user. Furthermore, changes in the environment of the battery, or the age of the battery, can affect the accuracy of the characteristics programmed into the mobile communication device.

SUMMARY

In accordance with the teachings described herein, systems and methods are provided for downloading battery data to a mobile communication device. A system for downloading battery data to a mobile communication device may include a mobile communication device and a data server. The mobile communication device may be configured to monitor a battery operating condition and to receive a battery profile, the battery profile including battery data for use by the mobile communication device to calculate battery status information. The data server may be used for storing battery data, the data server being configured to receive the battery operating condition from the mobile communication device and, based on the battery operating condition, send the battery profile to the mobile communication device.

DETAILED DESCRIPTION

Figure 1:
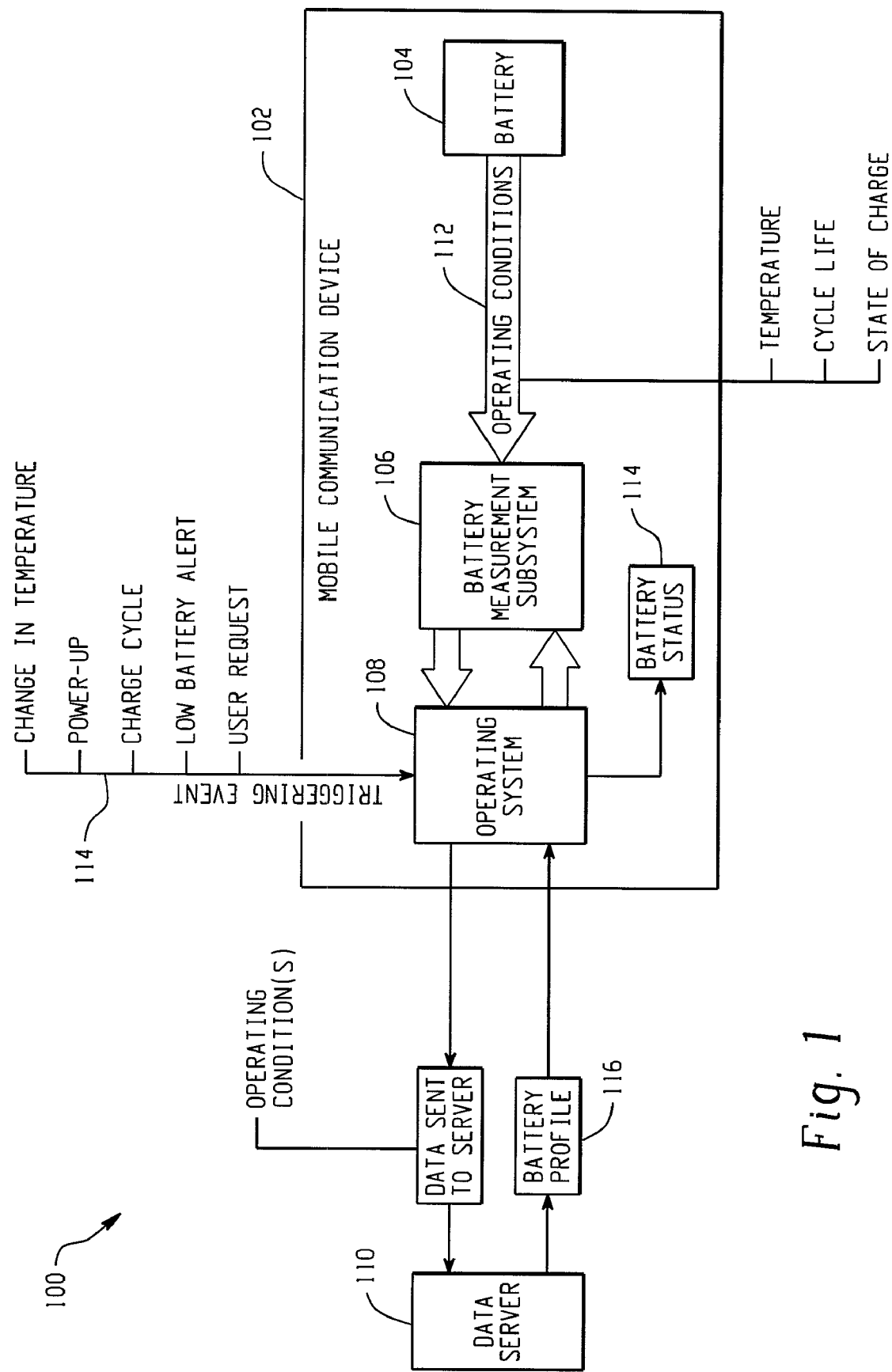
FIGS. 1-3 are block diagrams depicting example systems for determining the status of a rechargeable battery.

FIG. 1 is a block diagram depicting an example system 100 for determining the status of a rechargeable battery. The system includes a mobile communication device 102 and a data server 110. The mobile communication device 102 includes a rechargeable battery 104, a battery management subsystem 106, and an operating system 108. It should be understood, however, that the system 100 may also be used with other types of systems or devices that utilize a rechargeable battery.

The system 100 may be used to wirelessly download battery data to a mobile communication device 102. The mobile communication device 102 uses information stored in a battery profile, including operating conditions gathered from a battery 104 and battery characteristics preloaded during manufacture, to update the status of the battery to the user. As conditions of the mobile communication device 102 and the battery 104 change, the mobile communication device 102 may need different battery data to accurately determine the status of the battery 104. For example, deterioration of the battery 104 is not a factor that a manufacturer typically preprograms into the mobile communication device 102 to use in calculating the battery status. Another example is a wide change in the ambient temperature of the battery 104 that the mobile communication device may not be capable of handling. When those conditions change during the life of the battery 104, the operating system 108 cannot account for the changed conditions using a battery profile that was loaded during the manufacturing process.

To account for changed conditions, the mobile communication device 102 may be programmed with one or more triggering events 114 that cause the mobile communication device 102 to request updated battery data from a data server 110. A triggering event 114 that prompts the operating system 108 to send operating conditions 112 to the data server 110 may include a change in ambient temperature, a power-up of the mobile communication device, a new charge cycle of the battery, a low battery alert, and a request by the user of the mobile communication device. Following the triggering event 114, the mobile communication device 102 sends its current battery operating conditions 112 to the data server 110 so the mobile communication device 102 can receive an updated battery profile 116.

The data server 110 contains information used to characterize a battery in the form of battery profiles. The data server 110 receives the battery operating conditions 112 from the mobile communication device 102 and wirelessly transmits the corresponding battery profile 116 back to the device. The mobile communication device 102 may replace its existing battery profile with the battery profile 116 received from the data server 110. This new battery profile can be used to update the status of the battery on the mobile communication device. A benefit to updating a battery profile on the mobile communication device is that the information will be more applicable to the present condition of the battery. Thus, more accurate information will be available that allows the mobile communication device 102 to more efficiently use the battery 104 and provide more reliable information to the end user.

The mobile communication device 102 includes a rechargeable battery 104, a battery management subsystem 106, and an operating system 108. The battery management subsystem 106 may include one or more processing devices, such as a microprocessor or a DSP, and may also include one or more sensor devices for detecting operating conditions 112 of the battery 104. For example, the battery monitoring subsystem 106 may include sensor devices that allow the battery monitoring subsystem 106 to provide the operating system 108 with the ambient temperature of the battery 104 and the state of charge of the battery 104 to the operating system 108. The battery monitoring subsystem 106 may also include other devices or software to monitor the cycle life of the battery.

The operating system 108 controls the overall operation of the mobile communication device 102 and may include one or more microprocessors, DSPs, or other processing devices. Operating conditions received at the operating system 108 are used to update the battery status 114 of the mobile communication device 102.

Battery status 114 may include the fully charged capacity of the battery (the total capacity capable in the battery), the current usable capacity of the battery (the present capacity available in the battery), and the equivalent series resistance of the battery. The battery status 114 of the mobile communication device is based upon combinations of preloaded battery characteristics and operating conditions 112. These combinations are referred to as battery profiles, and are described in more detail below in reference to FIG. 5.

The data server 110 is configured to receive battery operating conditions 112 from a mobile communication device 102 and send battery data to the mobile communication device 102 based on the received operating conditions 112. The data server 110 stores battery data that includes battery profiles, which are linked to a corresponding battery and its battery operating conditions. Battery profiles include battery tables that contain battery operating conditions and battery characteristics. Each battery table includes a battery operating condition that is stored in relation to another battery operating condition or in relation to a battery characteristic. For instance, one battery table may include the temperature of the battery in relation to the equivalent series resistance of the battery (e.g., see battery table 332 in FIG. 5). The combination of the two elements allows the mobile communication device 102 to update the status of the battery 104. A battery profile may include any number of battery tables depending on the requirements of the mobile communication device 102 requesting the information. A complete battery profile, however, will contain each battery table that a particular mobile communication device uses to determine the battery status of its battery.

After the data server 110 receives the battery operating conditions 112, it selects the battery profile 116 that corresponds to the battery operating conditions 112. The data server 110 sends the battery profile 116 to the mobile communication device 102, which uses the battery profile 116 to calculate the battery status 114. The received battery profile 116 is used until the operating system 108 receives another triggering event 114, and subsequently receives another battery profile 116.

Figure 2:
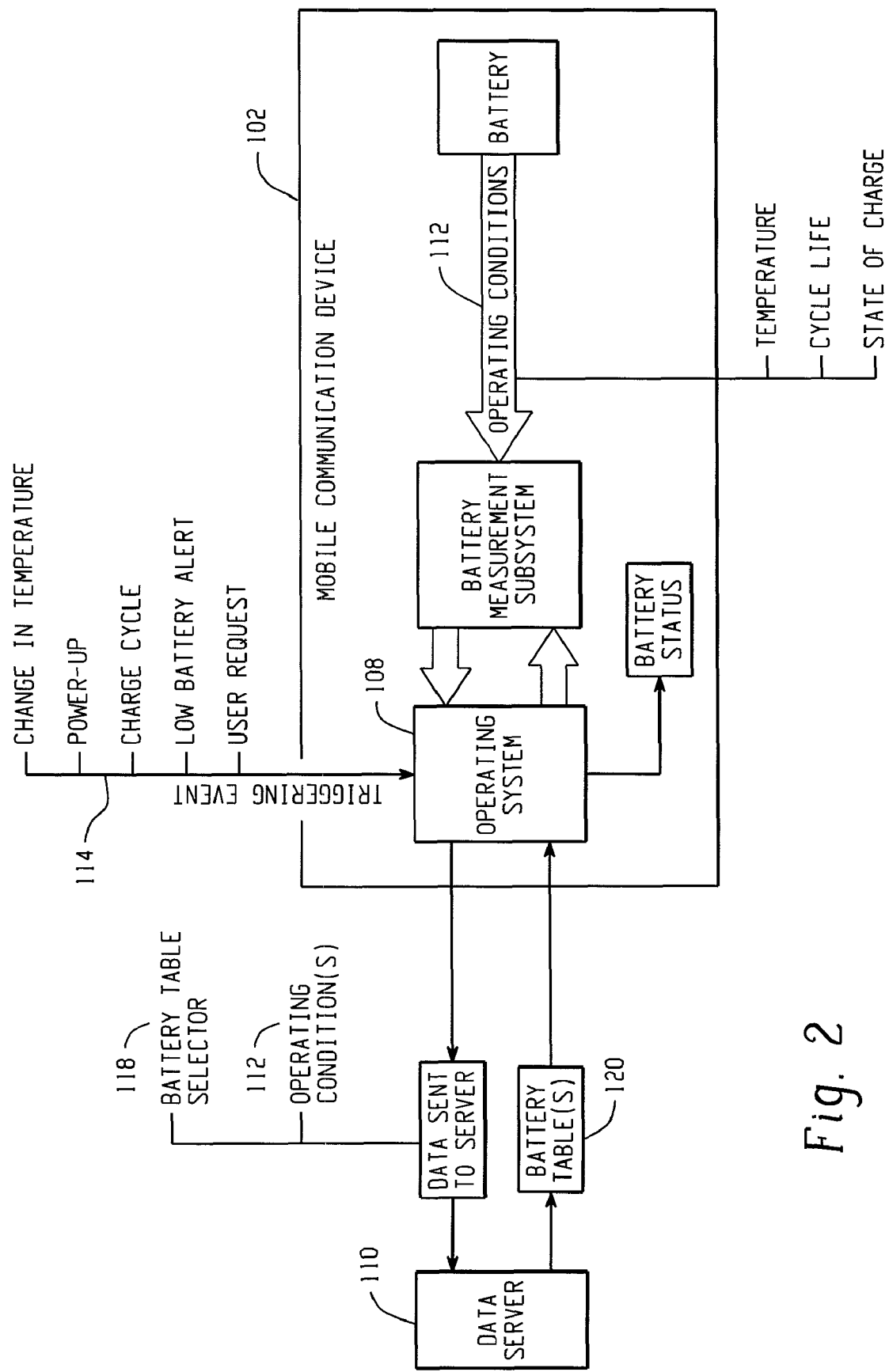

FIG. 2 depicts another example system for determining the status of a rechargeable battery. This system is similar to the system depicted in FIG. 1, except that the data server 110 returns only a selected battery table(s) 120, instead of the entire battery profile. As shown in FIG. 2, the operating system 108 sends a battery table selector 118 to the data server 110 to request only a portion of a battery profile. The battery table selector 118 may either be sent at a time before or after the operating conditions 112 are sent to the data server 110, or at the same time. The data server 110 uses the battery table selector 118 to select a specific battery table 120 from a battery profile that corresponds to the operating conditions 112. For example, if the triggering event 114 is a change in ambient temperature, the battery table selector 118 may direct the data server 110 to send only the one or more battery tables 120 that correspond to temperature, instead of sending the entire battery profile. The operating system 108 receives the one or more battery tables 120 and replaces only those corresponding portions of the battery profile stored on the mobile communication device 102. By replacing only a selected portion of the battery profile, the amount of processing is reduced on the mobile communication device and less network bandwidth is used.

Figure 3:
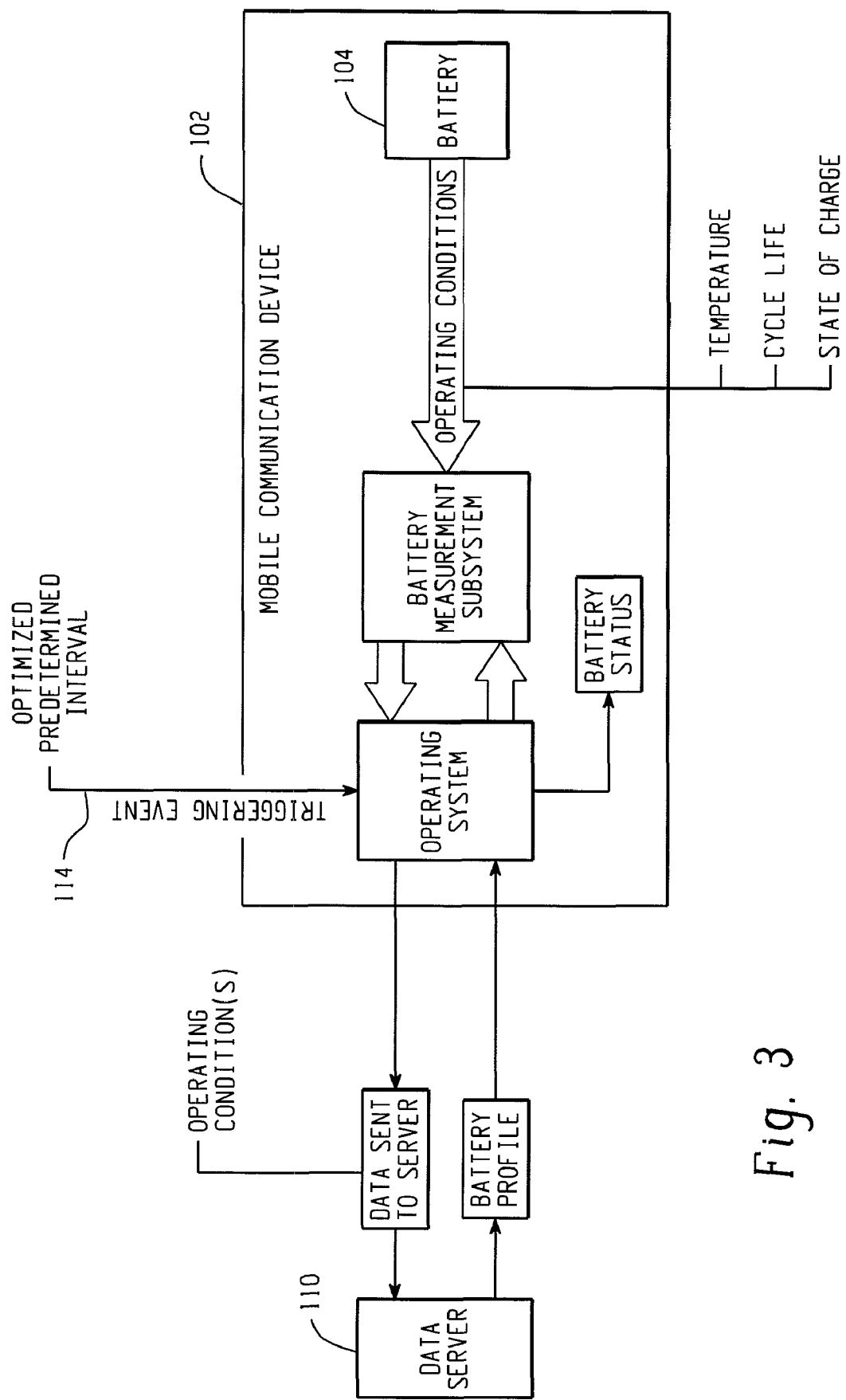

FIG. 3 illustrates yet another example system for determining the status of a rechargeable battery. In this example, the mobile communication device 102 automatically triggers the data server 110 to transmit a current battery profile at predetermined intervals 114. Further, the interval at which an updated battery profile is requested may be set so that the combination of receiving a battery profile, or battery tables, and battery life is optimized. The shorter the interval set to receive information from the data server, the larger a strain it will have on the battery 104 and on the wireless network. A shorter interval, however, will receive more frequent battery profiles, or tables, and provide for a more exact battery status. Thus, the optimized predetermined interval 114 may be calculated to provide for the most frequent amount of information received from the data server 110, without sacrificing a significant portion of battery life.

Figure 4:
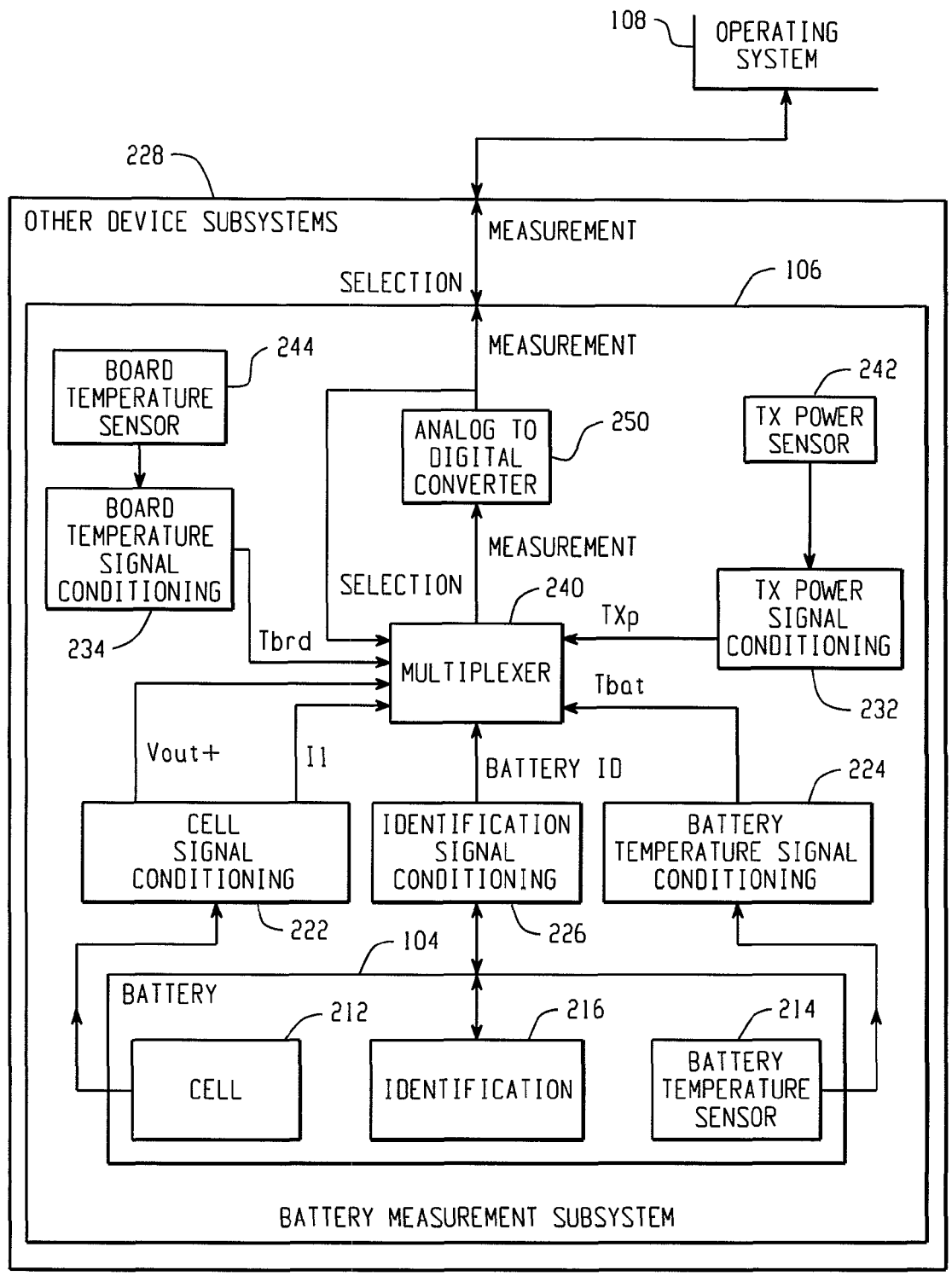
FIG. 4 is an example battery measurement subsystem for a mobile communication device.

FIG. 4 illustrates an example battery measurement subsystem 106 for a mobile communication device that can be utilized in a system to download battery data to the mobile communication device, such as the systems shown in FIGS. 1-3. The battery measurement subsystem 106 may receive a selection command from the operating system 108 and send a measurement value (i.e., a value indicating the battery state) to the operating system 108 in response to the selection command.

The battery measurement subsystem 106 includes a battery 104 that powers the mobile communication device. The battery 104 includes a cell 212, a battery temperature sensor 214, and an identification block 216. The identification block 216 may enable the operating system 108 to determine the type of battery 210.

The battery temperature sensor 214 provides a battery temperature signal that indicates the temperature of the battery 104. A battery temperature signal conditioning block 224 conditions the battery temperature signal to generate the signal Tbat. Conditioning functions performed by the signal conditioning block include filtering, scaling and/or amplifying. The signal conditioning block 224 may also perform other functions, such as providing bias required by the identification unit 216, multiplexer 240 and/or the analog to digital converter 250. After the Tbat signal is generated, it is coupled to an input of the multiplexer 240 for selection by the microprocessor 138.

A cell signal conditioning block 222 monitors the voltage and current of the cell 212. The cell signal conditioning block 222 provides a conditioned battery voltage signal, Vout+, and a conditioned battery current signal, I1, to the inputs of the multiplexer 240 for selection by the operating system 108.

In one embodiment, the cell signal conditioning block 222 may not provide a battery current. In this case, the current may be obtained indirectly by measuring TX power and by detecting other device states that affect current, such as operation of backlight, buzzer and LED (within the other device subsystems 228), as described below.

The TX power sensor 242 detects the transmit power of the transmitter 114 (FIG. 1), and inputs the transmit power to the TX power signal conditioning block 232. The TX power conditioning block 232 performs typical conditioning functions, such as filtering, scaling or amplifying, as well as providing a bias that may be required by the TX power sensor 242, multiplexer 240 and/or the analog to digital converter 250. The TX power conditioning block 232 generates the TXp signal that is coupled to the multiplexer 240 for selection by the operating system 108.

The incremental current consumption of the additional devices, such as backlight, buzzer and LED within the other device subsystems 228, are pre-characterized and their values are stored in flash memory 124 according to the states of these devices. The software that runs on the operating system 108 controls the operation of these device states and, therefore, the states can be detected and corresponding incremental current consumptions by these devices can be included in the processing.

A board temperature sensor 244 provides a board temperature signal, Tbrd, that indicates the temperature of the printed circuit board of the transceiver. This signal is conditioned by the board temperature signal conditioning block 234 and coupled to an input of the multiplexer 240.

The identification block 216, provides the identification signal Battery ID that is conditioned by the identification signal conditioning block 226 and input to the multiplexer 240.

In operation, multiplexer 240 responds to the selection signal sent by the operating system 108 to drive a select measurement signal such as: Tbrd, Vout+, I1, TXp, Tbat or the battery ID, through the analog to digital converter 250. The analog to digital converter 250 digitizes the signal output from the multiplexer 240 and sends the digital representation of the measurement value to the operating system 108. For example, if the operating system 108 requests a battery ID, a predetermined selection command assigned to the battery ID is transmitted to the multiplexer 240 of the battery measurement subsystem 106. The multiplexer 240 may use this command to switch the battery ID input to the output of the battery measurement subsystem 106.

Figure 5:
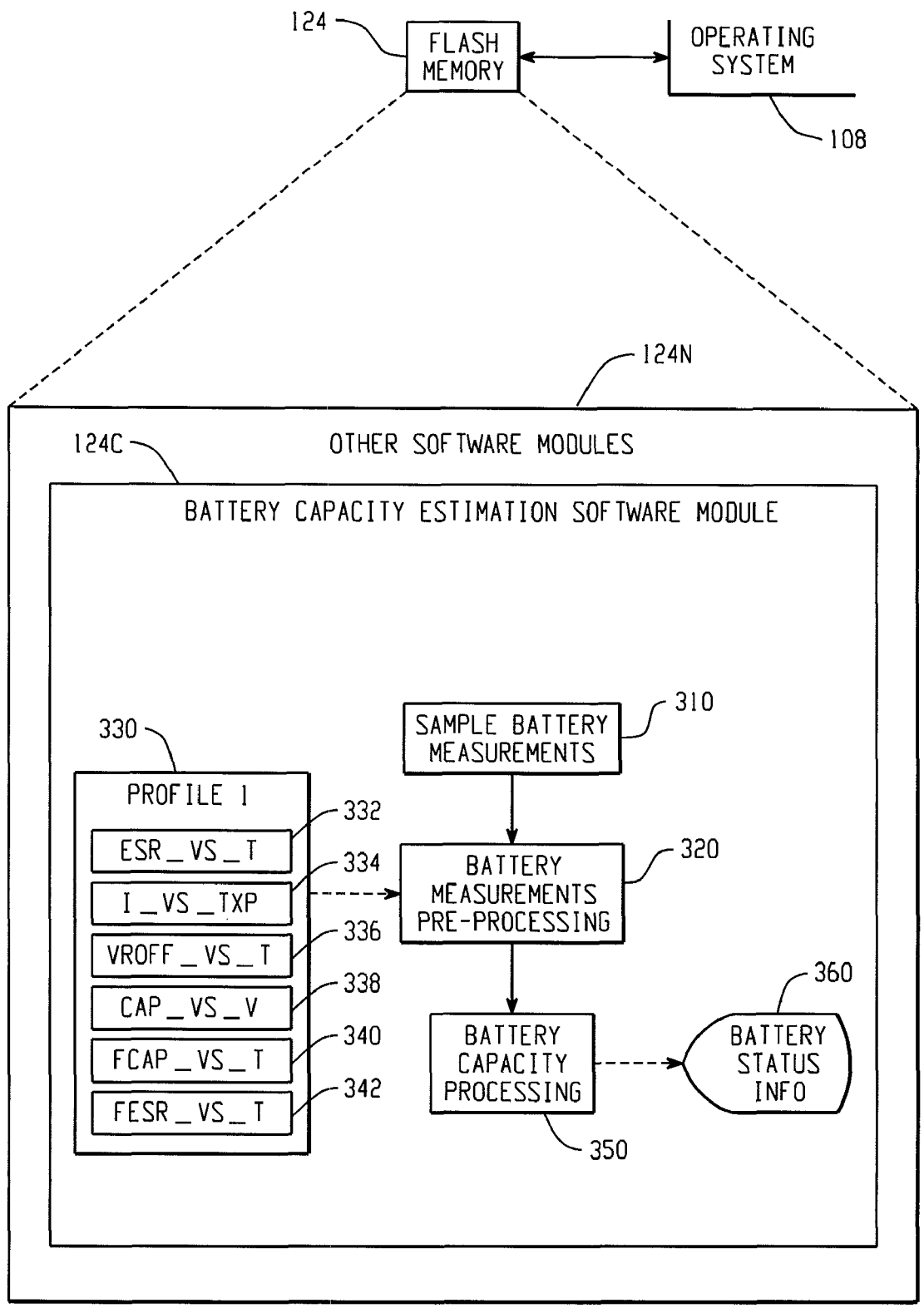
FIG. 5 is a flowchart of an example battery capacity processing method.

FIG. 5 includes a flowchart of an example battery capacity estimation method using a battery profile. A program for performing this method may, for example, be included in a software module in the mobile communication device of FIG. 1. As an example, FIG. 5 depicts a battery capacity estimation software module 124C, which is included in other software modules 124N and may be stored in a flash memory 124.

In operation, at step 310, the method samples the battery measurements that include various operating parameters of the battery, such as temperature (T), loaded voltage (V_load), current (I1), and transmit power (TXp). When the method is used in cooperation with the subsystem of FIG. 4, this step may include instructing the operating system 108 to send at least one selection signal to the multiplexer 240 of the battery measurement subsystem 106. The operating system 108 then reads the selected measurement for each selection signal sent at the output of the analog to digital converter 250.

At step 320, the battery measurements sampled at step 310 are pre-processed to provide intermediate results used in the battery capacity processing step 350. In preprocessing, at least one battery profile 330 is used to translate the measurement to a corresponding value (e.g., temperature to resistance).

Battery profile 330 may support a battery that a user may plug in and use on a mobile communication device. Each battery profile 330 identifies a given battery pack. In other words, for a specific battery there corresponds a specific battery profile 330.

As described below, values of the table in the profile 330 are dependent on the maker/model/version/batch of the battery. The values are determined at the time of battery manufacture and are loaded into the profile table 330. During use in the data server, the values may be updated through calibration between the mobile communication device and the data server.

Each battery profile 330 may include multiple tables that profile a particular battery. These tables may include the Equivalent Series Resistance (ESR) versus battery temperature (Tbat) 332, the current (I) versus transmit power (TXP) 334, the battery voltage threshold value at which the radio shuts off (VROFF) stored as a function of board temperature (Tbrd) 336, the battery capacity (CAP) as a function of unloaded voltage (V) 338, the battery capacity compensation factor at temperature Tbat 340, and the ESR compensation factor at temperature Tbat 342. This is illustrated as Profile 1 330.

One example of an intermediate result of the pre-processing step 320 may include ESR_VS_T 332. A table translates the temperature to resistance through linear interpolation in the battery capacity estimation method. The table size may, for example, be eight elements that are equally spaced between −20° to 75° C., unsigned. This interpolation can be expressed by:

$$ESR(Tbat)=\text{Linear\_interpolate}(ESR\_VS\_T, Tbat);$$

where Linear_interpolate (ESR_VS_T, Tbat) represents the linear interpolation of the table ESR_VS_T at temperature Tbat. The values stored in the table are the average values obtained by characterization of the battery pack upon manufacture.

The battery capacity processing 350 takes place using the intermediate results of the above-described preprocessing step 320. The result of step 350 is the battery status info that is used to update the battery status of the mobile communication device.

Figure 6:
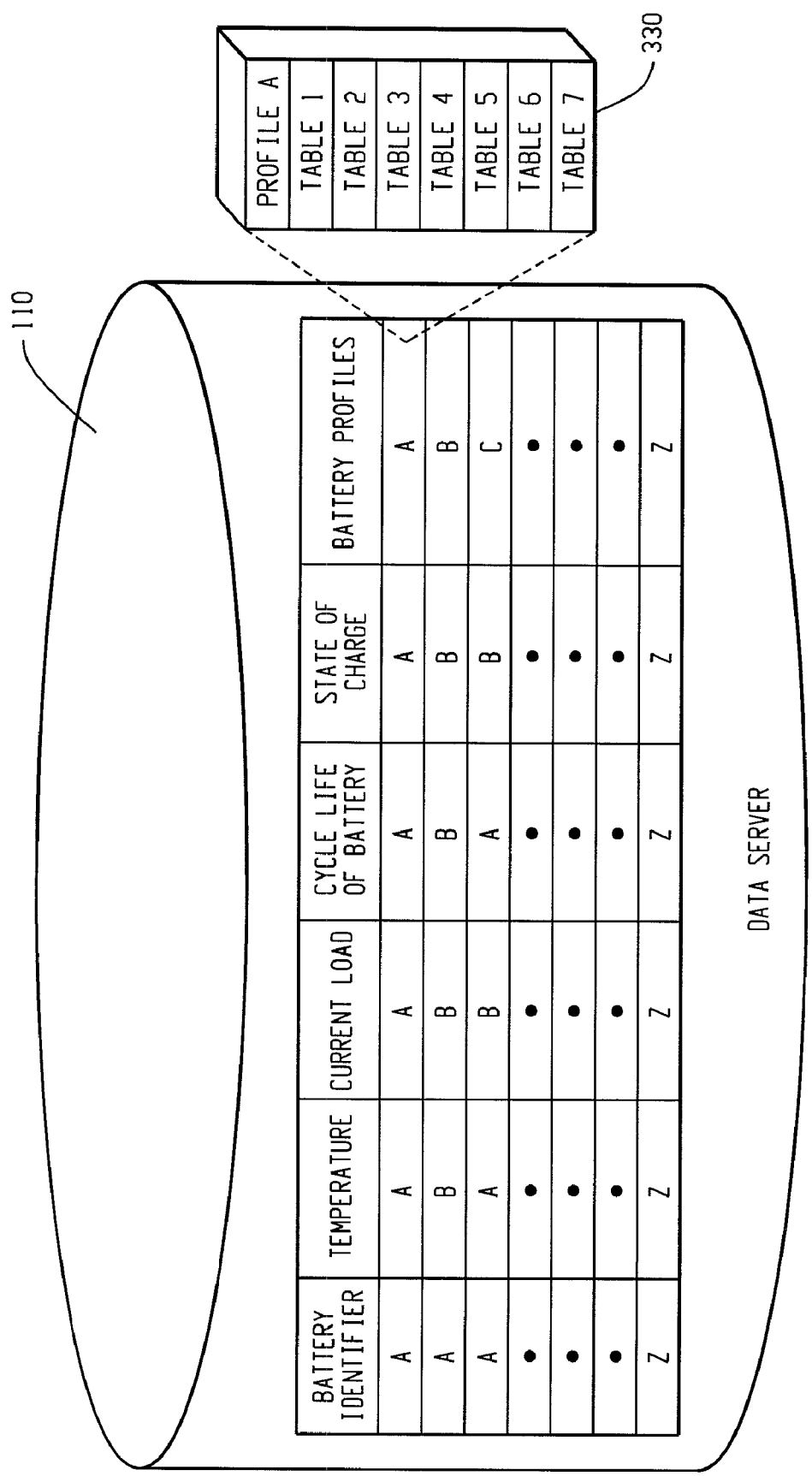
FIG. 6 is an example data server for storing battery profiles.

With reference to FIG. 6, an example data server 110 is depicted. The data server 110 is configured to store battery data in a table-like format with columns for a battery identifier, battery operating conditions, and battery profiles. The data for the battery operating conditions is stored in ranges, so that corresponding operating conditions received by the data server can be matched within a certain range of data. Other methods for storing data may also be used, such as storing specific values for each battery operating condition, and subsequently matching the received battery condition to the closest value in the table.

In the example shown, the data server 110 stores battery identifiers that correspond to a plurality of batteries that may be used in a mobile communication device. For each battery, there will correspond a plurality of battery operating conditions, such as temperature, current load, cycle life of battery, and state of charge. For each different combination of battery operating conditions with a battery identifier, there will correspond a battery profile. An example of a battery profile is shown as Profile A 330.

Based on the number of operating conditions, the battery profile 330 contains battery tables relating to a plurality of conditions. Profile A 330 shows seven battery tables as only one example. The method for calculating battery tables within a battery profile is described above in reference to FIG. 5. Depending on the data sent by the mobile communication device to the data server, the data server may either return the entire battery profile or one or more battery tables. If the data server does not receive a battery table selector from the mobile communication device, an entire battery profile will be sent. If the data server receives a battery table selector, then the data server will only return those battery tables specified by the battery table selector.

Figure 7:
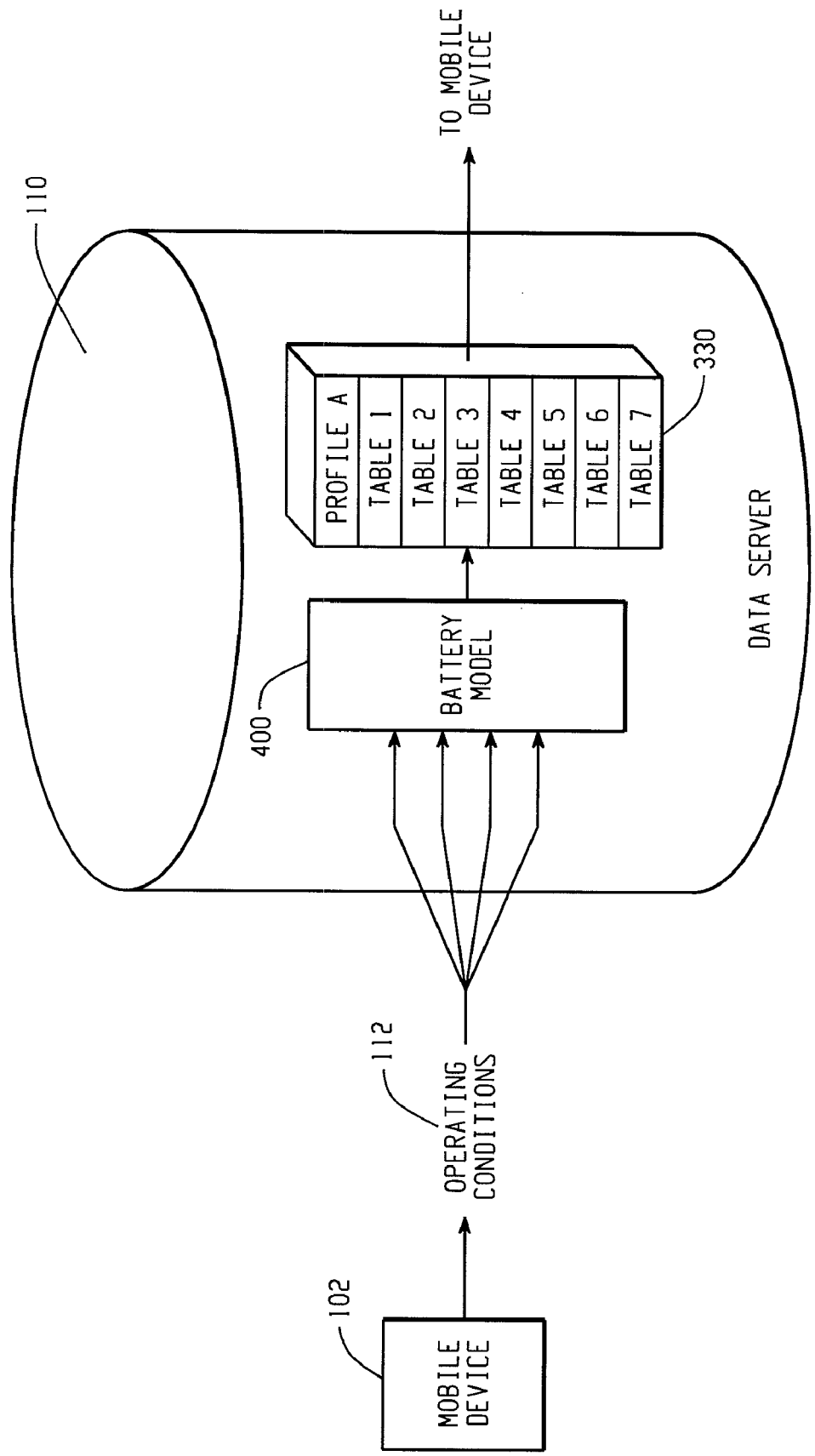
FIG. 7 is an example data server utilizing a battery model to generate a battery profile.

In another embodiment, the data server 110 includes a battery model 400, as shown in FIG. 7. In operation, the battery model 400 receives one or more operating conditions 112 from the mobile communication device 102. The battery model 400 utilizes the one or more operating conditions to generate one or more battery profiles. Because the battery model 400 does not store each battery profile in relation to battery operating conditions, the battery model 400 does not require as much storage capacity as the example data server in FIG. 6. Thus, by generating a battery profile for each request received from a mobile communication device, the battery model 400 may provide for a more efficient system.

Figure 8:
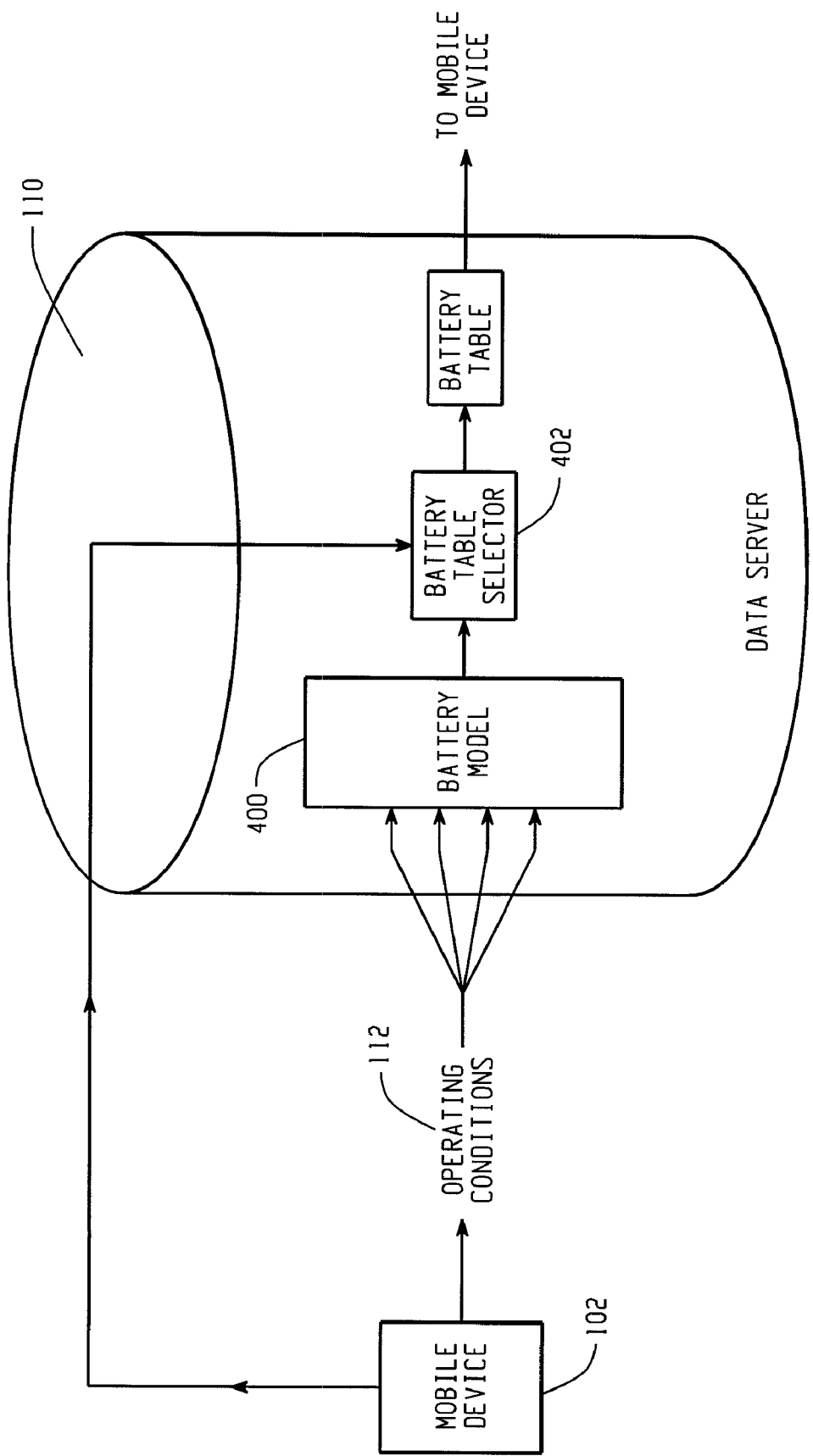
FIG. 8 is an example data server utilizing a battery model and a battery table selector.

In another embodiment, the data server 110 includes a battery model 400 and a battery table selector module 402, as shown in FIG. 8. The battery model 400 operates in the same manner as described above in relation to FIG. 7. The battery table selector module 402 receives a battery table selector signal from the mobile communication device 102 that specifies a specific battery table to be sent to the mobile communication device. The battery model 400 may produce the entire battery profile, but the battery table selector module 402 specifies which table, or tables, in the profile will be sent to the mobile communication device 102. Therefore, the mobile communication device 102 does not receive an entire battery profile, and can only replace those corresponding tables in its pre-existing battery profile. This selection process reduces the processing requirement on the mobile communication device and network congestion.

Figure 9:
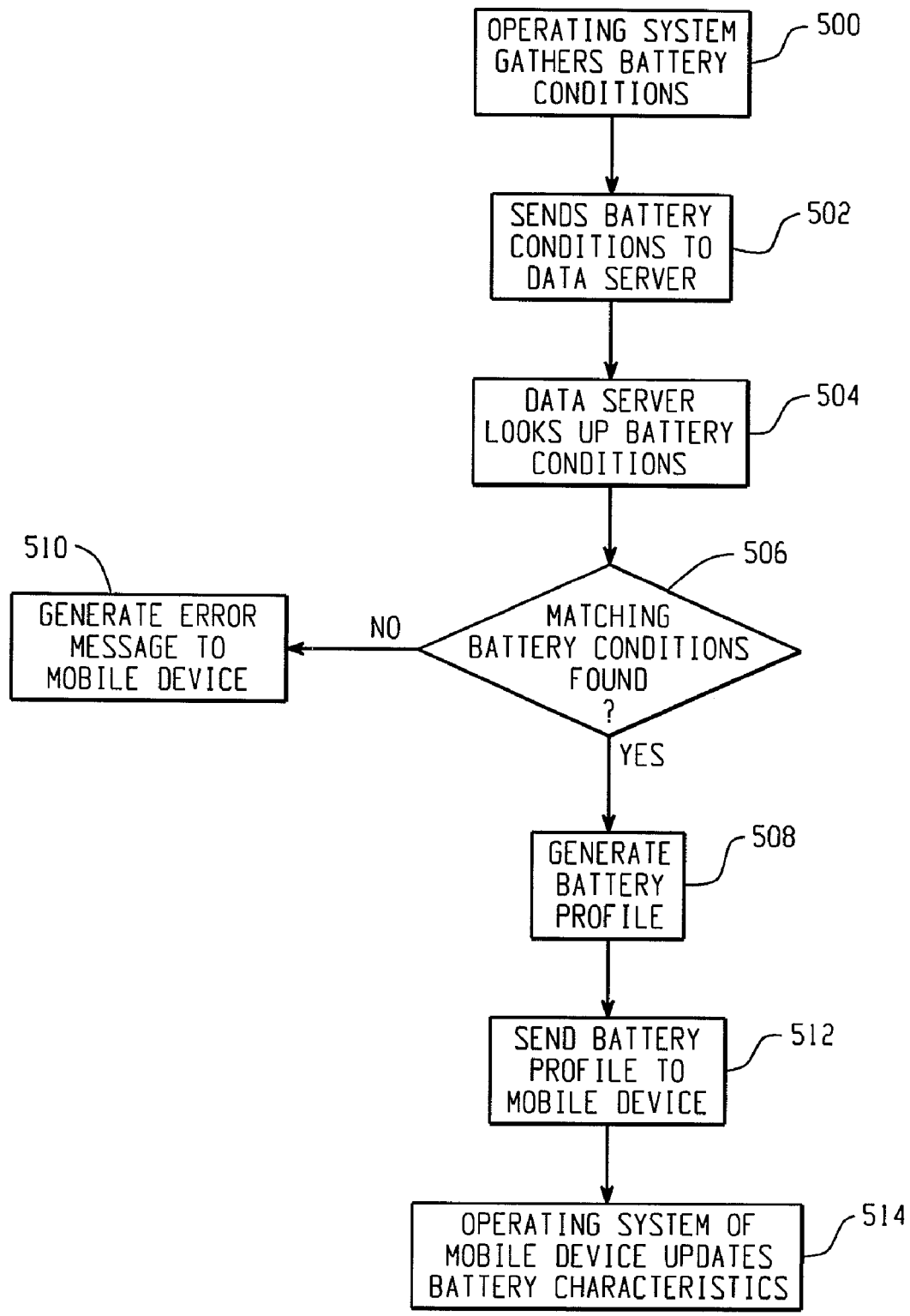
FIG. 9 is a flowchart of an example method for downloading battery data on a mobile communication device.

FIG. 9 is a flow diagram of an example method for downloading battery data on a mobile communication device. At step 500, the operating system of the mobile communication device obtains battery operating conditions from the battery measurement subsystem. The battery operating conditions are gathered by the battery measurement subsystem of the mobile communication device. If a triggering event occurs, then the operating system sends the battery operating conditions to the data server at step 502. At this step, the operating system may also send a battery table selector to the data server. The battery table selector may be utilized so that the data server only sends back the specified battery tables to the mobile communication device.

At step 504, the data server receives the one or more battery operating conditions from the mobile communication device and performs a search to find matching battery operating conditions for the battery. At step 506, the data server determines whether matching battery operating conditions are stored. If matching battery operating conditions are present in the data server, then the data server generates the corresponding battery profile at step 508. Depending on the mode of operation, the data server may generate the battery profile based on a corresponding profile identified, as described in relation to FIG. 6. The data server may also generate a battery profile using the battery model as explained above with reference to FIG. 7. For either method, if the battery operating conditions received from the mobile communication device do not match operating conditions on the data server that are associated with the specific battery, then the data server generates an error message at step 510 that is sent to the mobile communication device.

If a battery profile is generated by the data server, at step 512, then the data server sends the battery profile to the mobile communication device. If the mobile communication device sent the data server a battery table selector at step 502, then the data server only sends the selected battery table, or tables. At step 514, the operating system of the mobile communication device may use the battery profile to replace an existing battery profile. Likewise, if the data server only sends a battery table, the mobile communication device may only replace those tables that are received.

The method in FIG. 9 may also be configured so that the mobile communication device sends calibration information to the data server following step 514. The data server may use this calibration information to update the battery profiles so that a more accurate battery status can be calculated by the mobile communication device.

Figure 10:
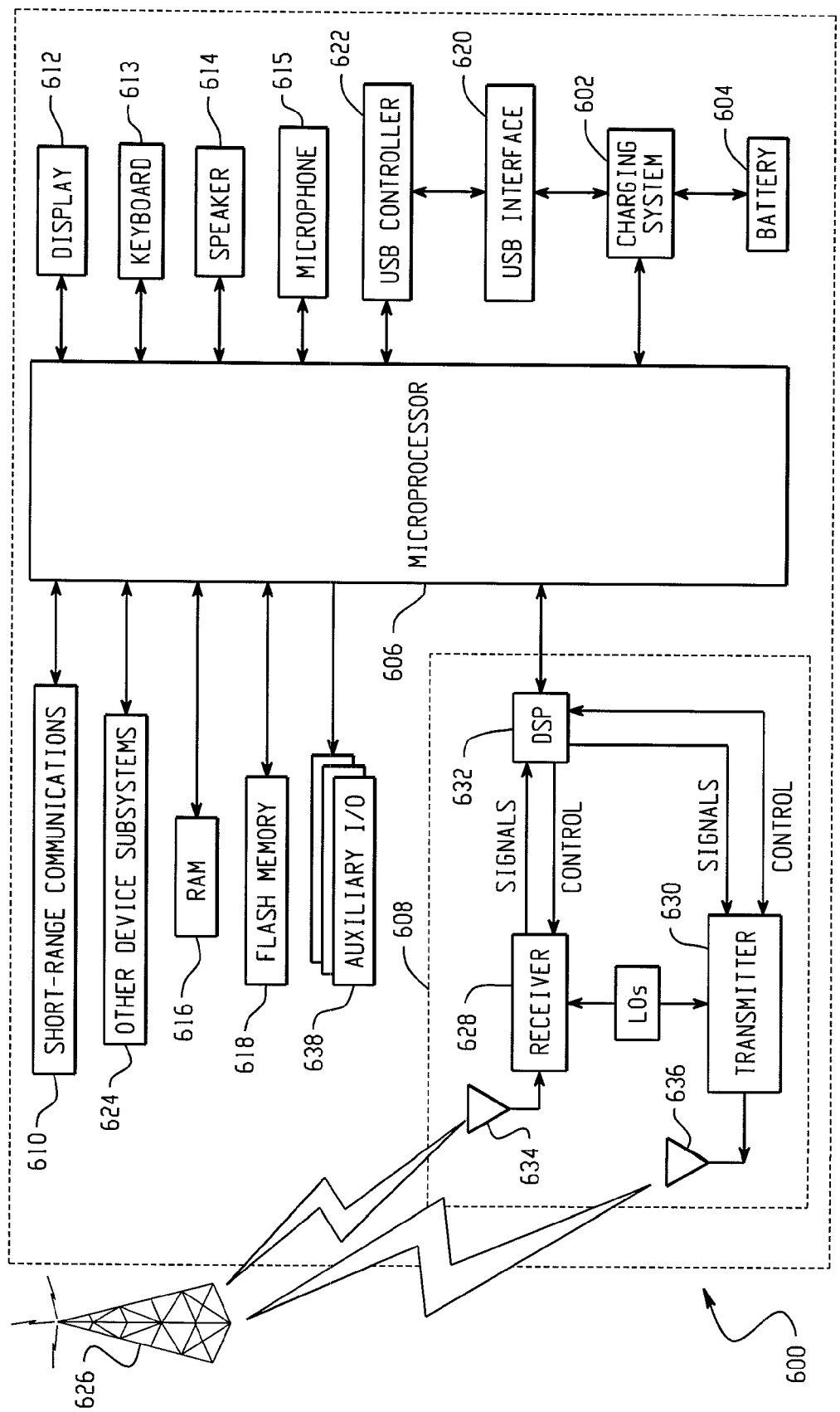
FIG. 10 is a block diagram of an example mobile communication device.

FIG. 10 is a block diagram of an example mobile device 600 that may include a system for determining the status of a battery. The mobile device 600 includes a charging subsystem 602 and a rechargeable battery 604. The charging subsystem 602 may include a battery measurement subsystem, as described herein. In addition, the rechargeable battery 604 may include an integrated memory device for storing battery deterioration information and/or other information pertaining to the battery 604. The mobile device 600 may also include a processing device 606, a communications subsystem 608, a short-range communications subsystem 610, input/output devices 612-615, memory devices 616, 618, a USB interface 620 and USB controller 622, and various other device subsystems 624.

In addition to measuring the status of a battery, the charging subsystem 602 charges the rechargeable battery 604 and provides power to the mobile device 600, either from the rechargeable battery 604 or from a USB host connected to the USB interface 620. The USB controller 622 monitors the USB data lines, and controls data communication between the processing device 606 and a USB host.

The processing device 606 controls the overall operation of the mobile device 600. Operating system software executed by the processing device 606 is preferably stored in a persistent store such as a flash memory 618, but may also be stored in other types of memory devices, such as a read only memory (ROM) or similar storage element. In addition, operating system software, specific device applications, or parts thereof, may be temporarily loaded into a volatile store, such as a random access memory (RAM) 616. Communication signals received by the mobile device 600 may also be stored to RAM 616.

The processing device 606, in addition to its operating system functions, enables execution of software applications on the device 600. A predetermined set of applications that control basic device operations, such as data and voice communications, may be installed on the device 600 during manufacture. In addition, a personal information manager (PIM) application may be installed during manufacture. The PIM is preferably capable of organizing and managing data items, such as e-mail, calendar events, voice mails, appointments, and task items. The PIM application is also preferably capable of sending and receiving data items via the wireless network 626. Preferably, the PIM data items are seamlessly integrated, synchronized and updated via the wireless network 626 with the device user's corresponding data items stored or associated with a host computer system.

Communication functions, including data and voice communications, are performed through the communication subsystem 608, and possibly through the short-range communications subsystem 610. If the mobile device 600 is enabled for two-way communications, then the communication subsystem 600 includes a receiver 628, a transmitter 630, and a processing module 632, such as a digital signal processor (DSP). In addition, the communication subsystem 608, configured as a two-way communications device, includes one or more, preferably embedded or internal, antenna elements 634, 636, and local oscillators (LOs) 638. The specific design and implementation of the communication subsystem 608 is dependent upon the communication network 626 in which the mobile device 600 is intended to operate. Network access requirements vary depending upon the type of communication system 626.

When required network registration or activation procedures have been completed, the mobile device 600 may send and receive communication signals over the communication network 626. Signals received by the antenna 634 through the communication network 626 are input to the receiver 628, which may perform such common receiver functions as signal amplification, frequency down-conversion, filtering, channel selection, and analog-to-digital conversion. Analog-to-digital conversion of the received signal allows the DSP to perform more complex communication functions, such as demodulation and decoding. In a similar manner, signals to be transmitted are processed by the DSP 632, and are then input to the transmitter 630 for digital-to-analog conversion, frequency up-conversion, filtering, amplification and transmission over the communication network 608 via the antenna 636.

In addition to processing communication signals, the DSP 632 provides for receiver 628 and transmitter 630 control. For example, gains applied to communication signals in the receiver 628 and transmitter 630 may be adaptively controlled through automatic gain control algorithms implemented in the DSP 632.

In a data communication mode, a received signal, such as a text message or web page download, is processed by the communication subsystem 608 and input to the processing device 606. The received signal is then further processed by the processing device 606 for output to a display 612, or alternatively to some other auxiliary I/O device 638. A device user may also compose data items, such as e-mail messages, using a keyboard 613, such as a QWERTY-style keyboard, and/or some other auxiliary I/O device 638, such as a touchpad, a rocker switch, a thumb-wheel, or some other type of input device. The composed data items may then be transmitted over the communication network 626 via the communication subsystem 608.

In a voice communication mode, overall operation of the device 600 is substantially similar to data communication mode, except that received signals are output to a speaker 614, and signals for transmission are generated by a microphone 615. Alternative voice or audio I/O subsystems, such as a voice message recording subsystem, may also be implemented on the device 600. In addition, the display 612 may also be utilized in voice communication mode, for example to display the identity of a calling party, the duration of a voice call, or other voice call related information.

The short-range communications subsystem 610 enables communication between the mobile device 600 and other proximate systems or devices, which need not necessarily be similar devices. For example, the short-range communications subsystem 610 may include an infrared device and associated circuits and components, or a Bluetooth™ communication module to provide for communication with similarly-enabled systems and devices.

This written description uses examples to disclose the invention, including the best mode, and also to enable a person skilled in the art to make and use the invention. The patentable scope of the invention may include other examples that occur to those skilled in the art.

It is claimed:

1. A mobile communication device comprising:
   a battery configured to power the mobile communication device;
   one or more sensor devices configured to monitor an operating condition of the battery; and
   an operating system configured to:
      wirelessly transmit a battery operating condition to a data server,
      wirelessly receive, from the data server, a battery profile corresponding to the current battery operating condition,
      measure, at said operating condition, a value relating to the battery, and
      calculate battery status information from the measured value using the battery profile;
   wherein the battery operating condition is battery temperature, and the battery profile is a table of equivalent series resistance (ESR) values vs. temperature.

2. The mobile communication device of claim 1, wherein the data server stores a plurality of battery profiles in relation to a plurality of battery operating conditions.

3. The mobile communication device of claim 1, wherein the battery status information is battery capacity.

4. The mobile communication device of claim 1, wherein the battery status information is usable battery capacity.

5. The mobile communication device of claim 1, wherein the battery status information is equivalent series resistance.

6. The mobile communication device of claim 1, wherein the mobile communication device sends the battery operating condition to the data server after a user request.

7. The mobile communication device of claim 1, wherein if the data server does not contain battery data corresponding to the battery operating condition, the data server is configured to send an error message to the mobile communication device.

8. The mobile communication device of claim 1, wherein the data server stores the battery operating condition received from the mobile communication device.

9. The mobile communication device of claim 1, wherein the mobile communication device receives a portion of the battery profile.

10. The mobile communication device of claim 1, wherein the mobile communication device selects a portion of the battery profile to be sent from the data server.

11. The mobile communication device of claim 1, wherein the mobile communication device replaces an existing battery profile with the battery profile received from the data server.

12. The mobile communication device of claim 9, wherein the mobile communication device replaces a portion of an existing battery profile with the portion of the battery profile received from the data server.

13. A data server for storing battery profiles, comprising:
   a plurality of battery identifiers, each identifying a different battery type;
   a plurality of battery operating conditions, the plurality of battery operating conditions including operating characteristics for each battery type; and
   a plurality of battery profiles, each corresponding to one of the battery identifiers and one of the battery operating conditions, the plurality of battery profiles containing information used to calculate battery status information and replace an existing battery profile on a mobile communication device;
   wherein the data server is configured to wirelessly receive a current operating condition and a current battery identifier from the mobile communication device and to wirelessly transmit a battery profile to the mobile communication device corresponding to the current operating condition and the current battery identifier;
   wherein the battery operating condition is battery temperature, and the battery profile is a table of equivalent series resistance (ESR) values vs. temperature.

14. The data server of claim 13, wherein the data server stores a plurality of battery profiles in relation to a plurality of battery operating conditions.

15. The data server of claim 13, wherein the battery status information is battery capacity.

16. The data server of claim 13, wherein the battery status information is usable battery capacity.

17. The data server of claim 13, wherein the battery status information is equivalent series resistance.

18. The data server of claim 13, wherein the mobile communication device sends the current battery operating condition to the data server after a user request.

19. The data server of claim 13, wherein the mobile communication device sends the current battery operating condition to the data server after a predetermined event.

20. The data server of claim 13, wherein if the data server does not contain battery data corresponding to the current battery operating condition, the data server is configured to send an error message to the mobile communication device.

21. The data server of claim 13, wherein the data server stores the current battery operating condition received from the mobile communication device.

22. The data server of claim 13, wherein the mobile communication device receives a portion of the battery profile.

23. The data server of claim 13, wherein the mobile communication device selects a portion of the battery profile to be sent from the data server.

24. The data server of claim 13, wherein the mobile communication device replaces an existing battery profile with the battery profile received from the data server.

25. The mobile communication device of claim 1 wherein the operating system is configured to transmit the battery operating condition to the data server in response to a change in ambient temperature.

26. A mobile communication device comprising:
a battery configured to power the mobile communication device;
one or more sensor devices configured to monitor an operating condition of the battery; and
an operating system configured to:
wirelessly transmit a battery operating condition to a data server,
wirelessly receive, from the data server, a battery profile corresponding to the current battery operating condition,
measure, at said operating condition, a value relating to the battery, and
calculate battery status information from the measured value using the battery profile;
wherein the battery-related value is battery temperature, and the battery status information is an equivalent series resistance (ESR) value.

27. The mobile communication device of claim 26, wherein the mobile communication device sends the battery operating condition to the data server after a user request.

28. The mobile communication device of claim 26, wherein the mobile communication device selects a portion of the battery profile to be sent from the data server.

* * * * *